(12) United States Patent
Hsiao et al.

(10) Patent No.: US 11,929,767 B2
(45) Date of Patent: *Mar. 12, 2024

(54) METHOD FOR TRANSFERRING SIGNALS VIA TRANSMISSION INTERFACE AND COMMUNICATIONS APPARATUS UTILIZING THE SAME

(71) Applicant: MEDIATEK INC., Hsin-Chu (TW)

(72) Inventors: Chieh-Hsun Hsiao, Hsin-Chu (TW); Ming-Chou Wu, Hsin-Chu (TW); Wen-Chang Lee, San Jose, CA (US); Narayanan Baskaran, San Jose, CA (US); Wei-Hsin Tseng, Hsinchu (TW); Jenwei Ko, San Jose, CA (US); Po-Sen Tseng, Hsinchu (TW); Hsin-Hung Chen, Hsin-Chu (TW); Chih-Yuan Lin, Hsin-Chu (TW); Caiyi Wang, San Jose, CA (US)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/888,475

(22) Filed: Aug. 16, 2022

(65) Prior Publication Data

US 2022/0393704 A1 Dec. 8, 2022

Related U.S. Application Data

(63) Continuation of application No. 16/776,513, filed on Jan. 30, 2020, now Pat. No. 11,469,781.

(Continued)

(51) Int. Cl.
*H04W 52/52* (2009.01)
*H04B 1/00* (2006.01)
*H04B 17/345* (2015.01)

(52) U.S. Cl.
CPC ................... *H04B 1/0057* (2013.01)

(58) Field of Classification Search
CPC ...... H04B 1/0057; H04B 1/006; H04B 1/525; H04B 1/0064; H04B 1/44; H04B 1/40;
(Continued)

(56) References Cited

U.S. PATENT DOCUMENTS 5,319,634 A * 6/1994 Bartholomew ........ H04B 3/542
370/441
8,670,322 B2 3/2014 Yehezkely
(Continued)

FOREIGN PATENT DOCUMENTS

CN 1816181 A 8/2006
CN 102655418 A 9/2012
(Continued)

*Primary Examiner* — Atique Ahmed
(74) *Attorney, Agent, or Firm* — Winston Hsu (57) ABSTRACT

A transmission interface between at least a first module and a second module is proposed. The transmission interface includes at least two physical transmission mediums. Each physical transmission medium is arranged to carry a multiplexed signal in which at least two signals are integrated. The at least two physical transmission mediums include a first physical transmission medium arranged to carry a first multiplexed signal including a first IF signal and a reference clock signal. The first IF signal and the reference clock signal are at different frequencies.

34 Claims, 6 Drawing Sheets

Related U.S. Application Data (60) Provisional application No. 62/814,913, filed on Mar. 7, 2019.

(58) Field of Classification Search
CPC ..... H04B 17/345; H04L 7/0091; H04L 25/03; H04L 27/3809; H03F 3/24; H04W 52/52
See application file for complete search history.

(56) References Cited

U.S. PATENT DOCUMENTS

| | | | |
|---|---|---|---|
| 8,687,736 B1 | 4/2014 | Huynh | |
| 9,496,948 B2 | 11/2016 | Yehezkely | |
| 10,594,383 B1* | 3/2020 | Orhan | H04B 7/0617 |
| 2010/0099451 A1 | 4/2010 | Saban | |
| 2012/0183102 A1 | 7/2012 | Willingham | |
| 2015/0087248 A1 | 3/2015 | Yehezkely | |
| 2015/0372710 A1* | 12/2015 | Longhurst | H04B 1/0053 |
| | | | 455/78 |
| 2016/0233869 A1 | 8/2016 | Khoury | |
| 2017/0230920 A1* | 8/2017 | Shwartz | H04L 7/0091 |
| 2017/0346506 A1 | 11/2017 | Perumana | |
| 2018/0259641 A1 | 9/2018 | Vacanti | |
| 2021/0126661 A1* | 4/2021 | Galeev | H04B 1/123 |
| 2021/0173042 A1* | 6/2021 | Wu | G01S 13/584 |
| 2021/0242915 A1* | 8/2021 | Orhan | H04B 7/0617 |
| 2021/0408697 A1* | 12/2021 | Rubin | H01Q 21/29 |

FOREIGN PATENT DOCUMENTS

| | | |
|---|---|---|
| CN | 105580282 A | 5/2016 |
| CN | 107343284 A | 11/2017 |
| EP | 2544378 | 1/2013 |
| EP | 3 050 216 A1 | 8/2016 |
| EP | 3 050 216 B1 | 8/2018 |

* cited by examiner

METHOD FOR TRANSFERRING SIGNALS VIA TRANSMISSION INTERFACE AND COMMUNICATIONS APPARATUS UTILIZING THE SAME

CROSS REFERENCE TO RELATED APPLICATION

This application is a continuation application of U.S. application Ser. No. 16/776,513, filed on Jan. 30, 2020, which claims the benefit of U.S. Provisional Application No. 62/814,913, filed on Mar. 7, 2019. The contents of these applications are incorporated herein by reference.

BACKGROUND

After some telecommunications System, such as a 3rd Generation Partnership Project (3GPP) Long-Term Evolution (LTE) system and a 3GPP LTE-Advanced (LTE-A) system have been well developed, various next-generation wireless cellular communication systems are being developed, such as a fifth generation (5G) wireless system/5G mobile networks system. Next-generation wireless cellular communication systems may provide support for higher bandwidths in part by supporting higher carrier frequencies, such as millimeter-wave frequencies.

In millimeter-wave communication network, the frequency is going higher than the legacy network for larger bandwidth available. However, higher frequency usually brings larger path loss.

Beamforming is an approach to compensate for the path loss in millimeter-wave communication. Beamforming has to be carried out between the gNB and the UE. When implementing the antenna beamforming, precise control of the equalizer and/or the phase shifter for each antenna element is required.

Besides the precise control in beamforming, substrate thickness and PCB trace routing are also important issues to be concerned. When multi-mode operation and/or antenna beamforming option have to be supported, several control signals have to be transmitted between different modules, and thus the module interface becomes more complicated. Complicated module interface may cause the substrate thickness to increase, and may also complicate the PCB trace routing. Both substrate thickness increase and bulky PCB trace routing will limit flexibility of system implementation.

With this in mind, a novel transmission interface approach for millimeter-wave system is required.

SUMMARY

It is one object of the present invention to provide a novel transmission interface utilized in a communications apparatus for transferring signals. In the transmission interface, one or more interconnections are configured for transmitting multiplexed signals in which at least two signals are integrated. In the proposed communications apparatus and the method for transferring signals via the proposed transmission interface, the low-IF or zero-IF control signal is applied with the reference clock signal transmission for millimeter-wave system application. In addition, to support rank-N MIMO scenario, a minimum of N interconnection(s) is adopted to transfer signals between two modules/signal processing devices, where N is a positive integer and N>=1.

As compared to the conventional design, lower power consumption and design complexity can be achieved. In addition, it is also easier to achieve control timing synchronization across multiple modules/signal processing devices, and the module design is more extensible. In addition, since in the embodiments of the invention, the reference clock signal REF_CLK is shared between multiple modules/signal processing devices, the noise correlation issue can be mitigated as compared to the conventional design and a better tradeoff between power and noise performance can be achieved.

According to one embodiment, a transmission interface between at least a master module and a slave module is proposed. The transmission interface comprises a predetermined number of physical transmission medium(s). Each physical transmission medium is arranged to carry a multiplexed signal in which at least two signals are integrated, and the predetermined number is not smaller than a number of intermediate frequency (IF) stream(s) to be transmitted.

According to another embodiment, a communications apparatus is provided. The communications apparatus comprises an intermediate frequency (IF) signal processing device, a radio frequency (RF) signal processing device and a transmission interface. The IF signal processing device is arranged to generate a predetermined number of IF stream(s) according to a baseband signal. The RF signal processing device is arranged to generate the predetermined number of RF stream(s) according to the IF stream(s) received from the IF signal processing device. The transmission interface is coupled between the IF signal processing device and the RF signal processing device and comprising one or more physical transmission medium(s). The number of physical transmission medium(s) is not smaller than the predetermined number of IF stream(s) to be transmitted by the IF signal processing device, and each physical transmission medium is arranged to carry a multiplexed signal in which at least two signals are integrated According to another embodiment, a method for transferring a plurality signals between a master module and a slave module is proposed. The method comprises: utilizing a predetermined number of physical transmission medium(s) to transfer the signals from the master module to the slave module or from the slave module to the master module, wherein each physical transmission medium is arranged to carry a multiplexed signal in which at least two signals are integrated, and the predetermined number is determined by a number of intermediate frequency (IF) stream(s) to be transferred from the master module.

These and other objectives of the present invention will no doubt become obvious to those of ordinary skill in the art after reading the following detailed description of the preferred embodiment that is illustrated in the various figures and drawings.

DETAILED DESCRIPTION

In the following, numerous specific details are described to provide a thorough understanding of embodiments of the present invention. However, one of skilled in the art will understand how to implement the present invention in the absence of one or more specific details, or relying on other methods, elements or materials. In other instances, well-known structures, materials or operations are not shown or described in detail in order to avoid obscuring the main concepts of the present invention.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1:
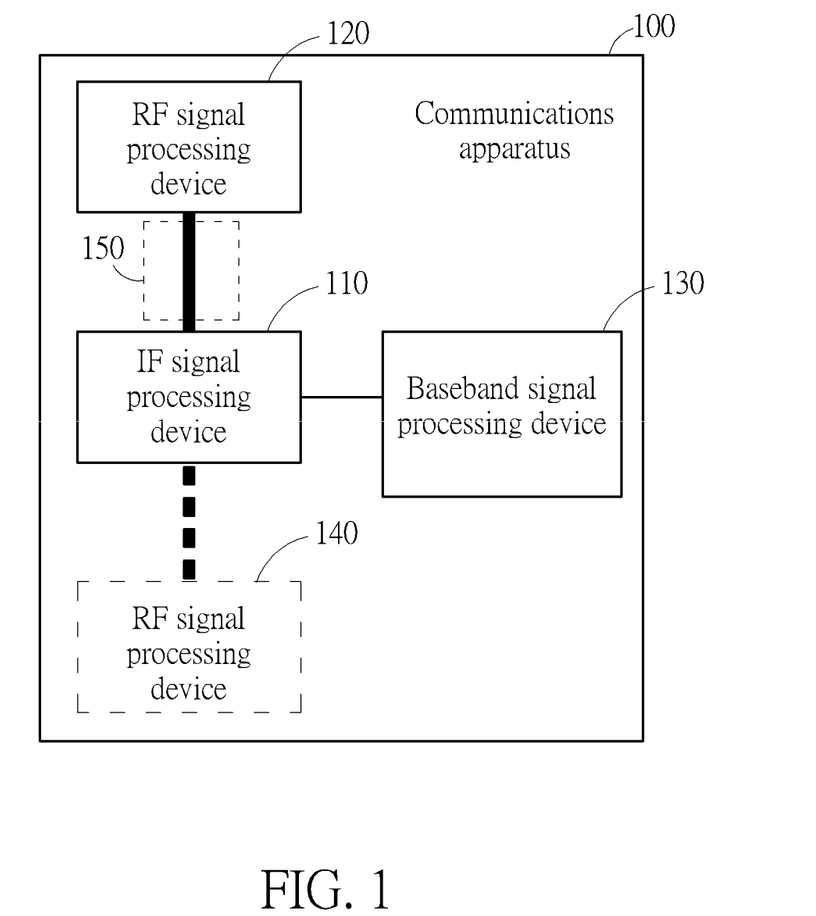
FIG. 1 is an exemplary block diagram of a communications apparatus according to an embodiment of the present invention.

FIG. 1 is an exemplary block diagram of a communications apparatus according to an embodiment of the present invention. The communications apparatus 100 may at least comprise an intermediate frequency (IF) signal processing device 110, a radio frequency (RF) signal processing device 120, a baseband signal processing device 130 and a transmission interface 150. Note that in some embodiments of the invention, the communications apparatus 100 may further comprise more than one RF signal processing device. As an example, to support multi-mode operations, the communications apparatus 100 may further comprise another RF signal processing device 140 (thus presented by dotted line). As another example, to further support multi-RAT operations, the communications apparatus 100 may further comprise some other RF signal processing device, RF front circuit and/or antenna module (not shown). Therefore, FIG. 1 presents a simplified block diagram in which only the elements relevant to the invention are shown, and the invention should not be limited to what is shown in FIG. 1.

According to an embodiment of the present invention, each of the IF signal processing device 110, RF signal processing device 120/140 and baseband signal processing device 130 may be implemented as an individual chip or packaged in an individual package, or several of them may be integrated in one chip or packaged in one package. The invention is not limited to any specific way of implementation.

The baseband signal processing device 130 is a signal processing circuit arranged to process and generate baseband signals. For example, the baseband signal processing device 130 may converts the signals, which may be analog signals, to a plurality of digital signals, and processes the digital signals, and vice versa. The baseband signal processing device 130 may comprise a plurality of hardware devices to perform baseband signal processing. The baseband signal processing may comprise analog to digital conversion (ADC)/digital to analog conversion (DAC), gain adjustment, modulation/demodulation, encoding/decoding, and so on.

The IF signal processing device 110 is a signal processing circuit arranged to generate a predetermined number of uplink IF stream(s) to be processed by the RF signal processing device 120/140 according to the baseband signals received from the baseband signal processing device 130, and also generate baseband signals according to the downlink IF stream(s) received from the RF signal processing device 120/140.

The RF signal processing device 120/140 is a signal processing circuit arranged to generate the predetermined number of uplink RF stream(s) according to the uplink IF stream(s) received from the IF signal processing device 110, and generate the downlink IF stream(s) according to the downlink RF stream(s) received from the air interface.

The transmission interface 150 is a collection of one or more physical transmission media coupled between the IF signal processing device 110 and the RF signal processing device 120 for transferring signals between the IF signal processing device 110 and the RF signal processing device 120. According to an embodiment of the present invention, the transmission interface 150 may comprise one or more physical transmission medium(s).

In an embodiment of the invention, the number of physical transmission medium(s) may be determined by the predetermined number of IF stream(s) to be transmitted by the IF signal processing device 110. For example, for the communications apparatus 100 being able to support rank-N MIMO technology, at least N interconnection(s) between the IF signal processing device 110 and the RF signal processing device 120/140 are necessary for transmitting N IF stream(s), where N is a positive integer greater than or equal to 1, and here, the interconnection(s) may be carried out by the afore-mentioned physical transmission medium(s). That is, in the embodiments of the invention, the number of physical transmission medium(s) may be not smaller than the predetermined number of IF stream(s) to be transmitted by the IF signal processing device 110. According to an embodiment of the present invention, the physical transmission medium may be a PCB routing, a cable, a trace, a transmission line, or others.

According to an embodiment of the present invention, each physical transmission medium is arranged to carry a multiplexed signal in which at least two signals are integrated.

Figure 2:
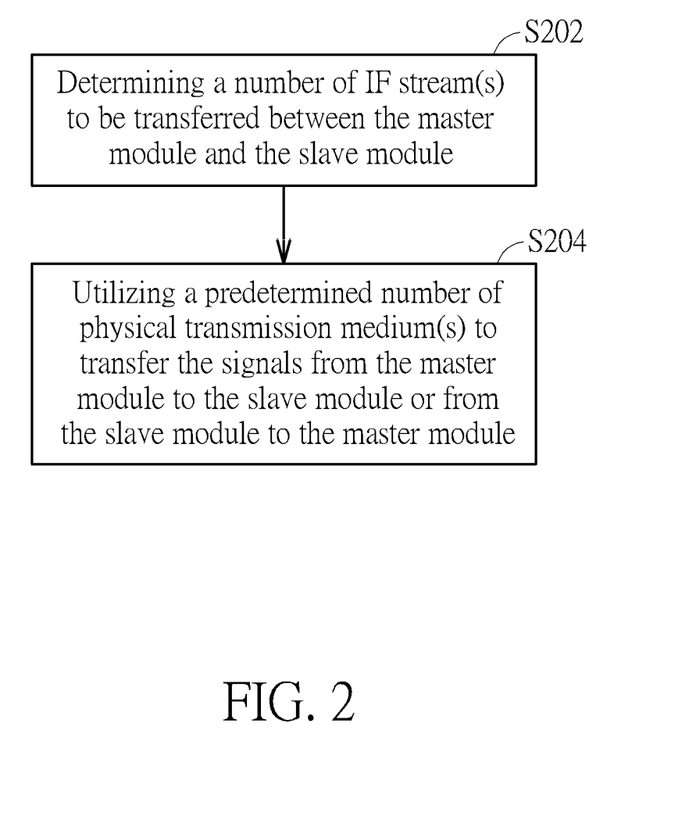
FIG. 2 is an exemplary flow chart illustrating a method for transferring a plurality signals between a master module and a slave module according to an embodiment of the present invention.

FIG. 2 is an exemplary flow chart illustrating a method for transferring a plurality signals between a master module and a slave module according to an embodiment of the present invention. In one embodiment, the master module is the IF signal processing device 110 and the slave module is the RF signal processing device 120.

In step S202, a number of IF stream(s) to be transferred between the master module and the slave module is determined.

In step S204, a predetermined number of physical transmission medium(s) is/are utilized to transfer the signals from the master module to the slave module or from the slave module to the master module. The predetermined number is determined by the number of IF stream(s), and each physical transmission medium is arranged to carry a multiplexed signal in which at least two signals are integrated.

Figure 3:
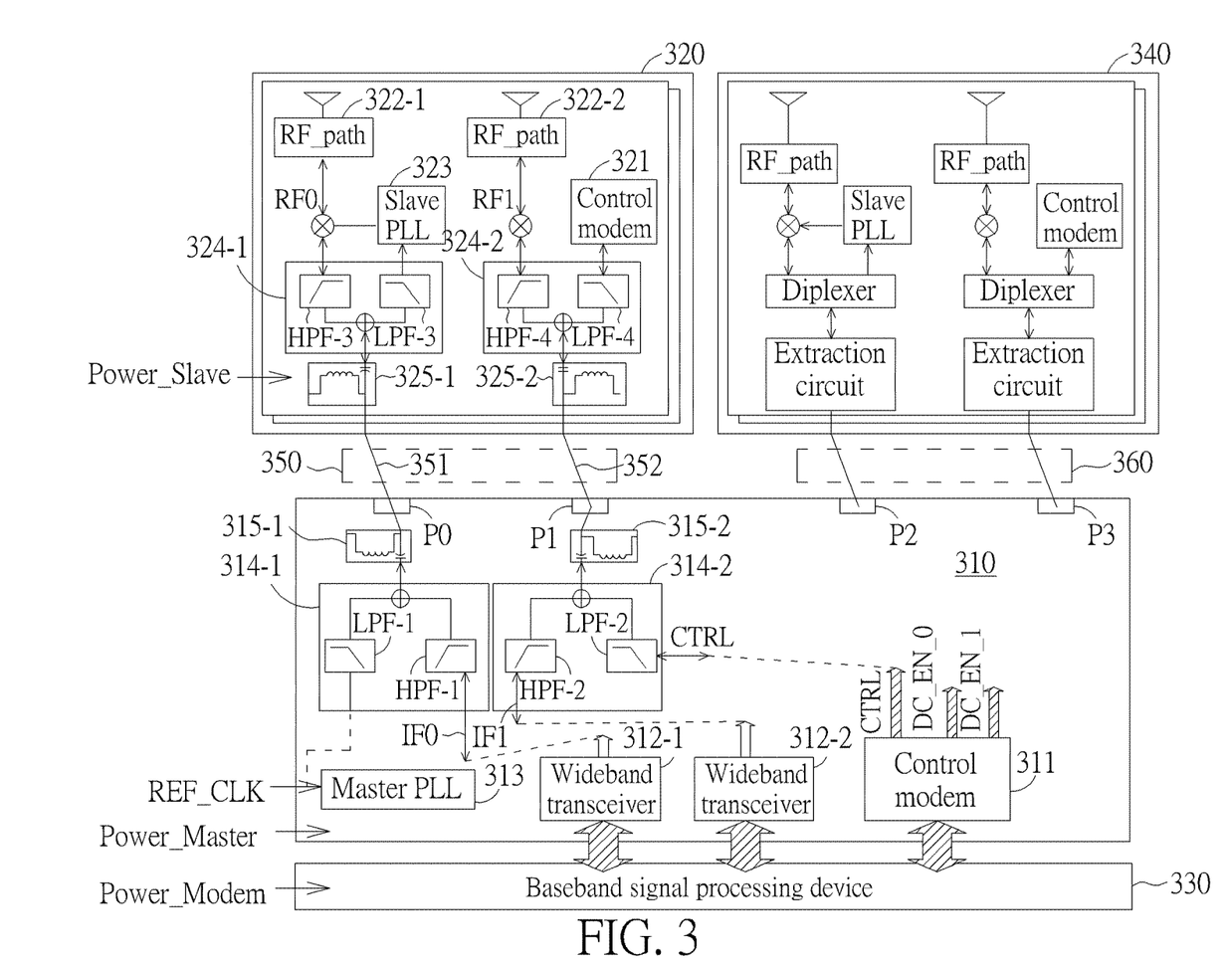
FIG. 3 is another exemplary block diagram providing a more detailed view of the communications apparatus for illustrating the structure of the proposed communications apparatus and the method for transferring signals between a master module and a slave module via the proposed transmission interface according to an embodiment of the present invention.

FIG. 3 is another exemplary block diagram providing a more detailed view of the communications apparatus for illustrating the structure of the proposed communications apparatus and the method for transferring signals between a master module and a slave module via the proposed transmission interface according to an embodiment of the present invention.

The baseband signal processing device 330 is arranged to process and generate baseband signals. The baseband signal processing device 330 may transmit and receive the baseband signals to and from the IF signal processing device 310. The power signal Power_Modem is arranged to provide power to the baseband signal processing device 330.

The IF signal processing device 310 is a master module in this embodiment. According to an embodiment of the invention, the communications system is a millimeter-wave communications system. The IF signal processing device 310 is arranged to generate a predetermined number of uplink IF stream(s) according to the baseband signals received from the baseband signal processing device 330 and generate baseband signals according to the downlink IF stream(s) received from the RF signal processing device 320 and provide the baseband signals to the baseband signal processing device 330. That is, the communication between the IF signal processing device 310 and the baseband signal processing device 330 is a bidirectional communication.

In this embodiment of the invention, the IF signal processing device 310 is arranged to generate and provide two IF stream(s) to a slave module. It should be noted that the number of IF stream(s) utilized in this embodiment is merely an example to illustrate the concept of the invention. As discussed above, the number of IF stream(s) is a positive integer greater than or equal to 1.

The power signal Power Master is arranged to provide power to the IF signal processing device 310. The IF signal processing device 310 may comprise a control modem 311 arranged to generate the control signal CTRL and the enable signals DC_EN_0 and DC_EN_1. The control signal CTRL is to be provided to the slave module, such as the RF signal processing device 320, for controlling operations of one or more components comprised in the RF signal processing device 320. The control signal CTRL is a combination of multiple control signals. The control modem 311 may modulate the multiple control signals as one control signal CTRL to be transmitted to the RF signal processing device 320.

The control signals may comprise, for example, a control signal for controlling operations of an equalizer (not shown) of the RF signal processing device 320, a control signal for controlling operations of a phase shifter (not shown) of the RF signal processing device 320, and others. It should be noted that control signal CTRL is a bi-directional control signal. In the uplink direction, the control signal CTRL carries multiple control signals for controlling operations of the elements comprised in the RF signal processing device 320 as discussed above. In the downlink direction, the control signal CTRL may carry some measurement results measured by the RF signal processing device 320. For example, a power measurement result measured by a power meter (not shown) of the RF signal processing device 320 may be carried in the control signal CTRL.

The enable signals DC_EN_0 and DC_EN_1 is to be provided to the slave module, such as the RF signal processing device 320, for activating one or more components comprised in the RF signal processing device 320. For example, the enable signal DC_EN_0 may be configured to activate a slave phase locked loop (PLL) circuit 323 in the RF signal processing device 320, and the enable signal DC_EN_1 may be configured to activate a control modem 321 in the RF signal processing device 320.

The IF signal processing device 310 may further comprise wideband transceivers 312-1 and 312-2 and a master PLL circuit 313. The master PLL circuit 313 may comprise an internal frequency synthesizer circuit or may be as a whole regarded as a frequency synthesizer circuit and is arranged to generate a first oscillating signal with a first frequency according to the reference clock signal REF_CLK. The first frequency may be an intermediate frequency (IF), such as 7 GHz~8 GHz, which is a relative low frequency as compared to the frequency Range 2 (FR2) that includes frequency bands from 24.25 GHz to 52.6 GHz bands in the millimeter-wave range.

In the uplink direction, the wideband transceivers 312-1 and 312-2 may receive the baseband signals from the baseband signal processing device 330 and perform up-conversion on the baseband signals according to the first oscillating signal provided by the master PLL circuit 313 to generate the IF signals IF0 and IF1. According to an embodiment of the invention, the IF signals IF0 and IF1 are two streams to be transmitted by different RF paths and may carry the same or different data, depending on the system requirements. In the downlink direction, the wideband transceivers 312-1 and 312-2 may receive the IF signals IF0 and IF1 from the RF signal processing device 320 and perform down-conversion on the IF signals to generate the baseband signals.

The IF signal processing device 310 may further comprise diplexer circuits 314-1 and 314-2. The diplexer circuits 314-1 and 314-2 are arranged to combine/separate uplink/downlink signals. According to an embodiment of the invention, in the uplink direction, the diplexer circuit 314-1 is arranged to combine the IF signal IF0 and the reference clock signal REF_CLK, and the diplexer circuit 314-2 is arranged to combine the IF signal IF1 and the control signal CTRL. The diplexer circuit 314-1 may comprise a high pass filter HPF-1 for filtering the IF signal IF0 and a low pass filter LPF-1 for filtering the reference clock signal REF_CLK before merging them together. Similarly, the diplexer circuit 314-2 may comprise a high pass filter HPF-2 for filtering the IF signal IF1 and a low pass filter LPF-2 for filtering the control signal CTRL before merging them together. In the downlink direction, the diplexer circuits 314-1 and 314-2 are arranged to separate the multiplexed signals received from the RF signal processing device 320 in a reverse manner.

It should be noted that instead of using separated high pass filter and low pass filter, the diplexer circuits 314-1 and 314-2 may also be implemented by cascaded narrow-bandwidth band-pass or band-reject filters or may be implemented as a multiplexer when there are further more signals integrated in the first/second multiplexed signal.

According to an embodiment of the invention, the IF signal IF0 and the reference clock signal REF_CLK are modulated at different frequencies and are merged as a portion of a first multiplexed signal, and the IF signal IF1 and the control signal CTRL are modulated at different frequencies and are merged as a portion of a second multiplexed signal.

The IF signal processing device 310 may further comprise one or more injection circuits, such as the injection circuits 315-1 and 315-2. The injection circuit may be a filter circuit or a circuit comprising one or more passive devices, such as a capacitor and/or an inductor.

The injection circuit 315-1 is coupled to a terminal of the diplexer circuit 314-1 and arranged to inject an enable signal, such as the enable signal DC_EN_0, into an output of the diplexer circuit 314-1 to generate the first multiplexed signal. That is, in this embodiment, the first multiplexed signal may comprise the IF signal IF0, the reference clock signal REF_CLK and the enable signal DC_EN_0.

Similarly, the injection circuit 315-2 is coupled to a terminal of the diplexer circuit 314-2 and arranged to inject another enable signal, such as the enable signal DC_EN_1, into an output of the diplexer circuit 314-2 to generate the second multiplexed signal. That is, in this embodiment, the second multiplexed signal may comprise the IF signal IF1, the control signal CTRL and the enable signal DC_EN_1.

In this embodiment, the transmission interface 350 may comprise two interconnections, such as the physical transmission medium 351 and physical transmission medium 352, connected between the master module, such as the IF signal processing device 310, and the slave module, such as the RF signal processing device 320.

The physical transmission medium 351 is coupled to a first port P0 (or, a first pin) of the IF signal processing device 310 and arranged to carry the first multiplexed signal bi-directionally. The physical transmission medium 352 is coupled to a second port P1 (or, a second pin) of the IF signal processing device 310 and arranged to carry the second multiplexed signal bi-directionally.

The power signal Power Slave is arranged to provide power to the RF signal processing device 320. The RF signal processing device 320 may comprise one or more extraction circuits, such as the extraction circuits 325-1 and 325-2. The extraction circuit may be a filter circuit or a circuit comprising one or more passive devices, such as a capacitor and/or an inductor.

The extraction circuit 325-1 is coupled to the physical transmission medium 351 and arranged to extract the enable signal, such as the enable signal DC_EN_0, from the first multiplexed signal.

The extraction circuit 325-2 is coupled to the physical transmission medium 352 and arranged to extract the enable signal, such as the enable signal DC_EN_1, from the second multiplexed signal.

The RF signal processing device 320 may further comprise diplexer circuits 324-1 and 324-2. The diplexer circuits 324-1 and 324-2 are arranged to combine/separate downlink/uplink signals. According to an embodiment of the invention, in the uplink direction, the diplexer circuit 324-1 is arranged to separate the IF signal IF0 and the reference clock signal REF_CLK, and the diplexer circuit 324-2 is arranged to separate the IF signal IF1 and the control signal CTRL.

The diplexer circuit 324-1 may comprise a high pass filter HPF-3 for filtering the IF signal IF0 and a low pass filter LPF-3 for filtering the reference clock signal Ref_CLK so as to separate them from each other. Similarly, the diplexer circuit 324-2 may comprise a high pass filter HPF-4 for filtering the IF signal IF1 and a low pass filter LPF-4 for filtering the control signal CTRL so as to separate them from each other.

The RF signal processing device 320 may further comprise a control modem 321 and a slave PLL circuit 323. The control modem 321 is arranged to demodulate the control signal CTRL to obtain the multiple control signals transmitted by the control modem 311, and transmit the control signals to the corresponding components for controlling the operations thereof.

The slave PLL circuit 323 is arranged to receive the reference clock signal REF_CLK. The slave PLL circuit 323 may comprise an internal frequency synthesizer circuit or may be as a whole regarded as a frequency synthesizer circuit and is arranged to generate a second oscillating signal with a second frequency according to the reference clock signal REF_CLK. It should be noted that in the embodiment of the invention, the slave PLL circuit 323 and the master PLL circuit 313 use the same reference clock signal REF_CLK to generate the oscillating signal. That is, in the embodiment of the invention, instead of transmitting the first oscillating signal, the master module/IF signal processing device 310 transmits the reference clock signal REF_CLK utilized therein to the slave module/RF signal processing device 320.

According to an embodiment of the invention, the second frequency may be the carrier frequency, such as 28 GHz, 39 GHz or others, utilized in the communications system. The second oscillating signal is provided to individual mixers to perform up-conversion on the extracted IF signals IF0 and IF1 and thereby generating the RF signals (RF data streams) RF0 and RF1.

The RF signal processing device 320 may further comprise RF signal processing paths RF path 322-1 and 322-2. The RF signal processing paths RF path 322-1 and 322-2 may respectively comprise a plurality of hardware devices to perform RF signal processing. The RF signals RF0 and RF1 are respectively provided to the RF path 322-1 and 322-2 for being further processed, and then transmitted by the corresponding antenna or antenna array to the air interface.

In the downlink direction, the RF path 322-1 and 322-2 are arranged to process the downlink RF signals received from the air interface and provide the processed RF signals to the mixers for performing down-conversion on the processed RF signals to generate the IF signals. The IF signals are then provided to the diplexer circuit 324-1 and/or 324-2 for merging the IF signals with the downlink control signal CTRL.

In the embodiment of the invention, the IF signal processing device 310/master module may be coupled to more than one slave module. As shown in FIG. 3, the IF signal processing device 310 may be coupled to another slave module, such as the RF signal processing device 340 via another transmission interface 360 coupled to ports P2 and P3. The RF signal processing device 340 may have a similar structure as the RF signal processing device 320, and the data transmissions between the IF signal processing device 310 and the RF signal processing device 340 may be also similar to the RF signal processing device 320. Thus, the illustrations of data transmissions are omitted here for brevity.

As discussed above, the signals integrated in the first/second multiplexed signal are modulated at different frequencies.

Figure 4:
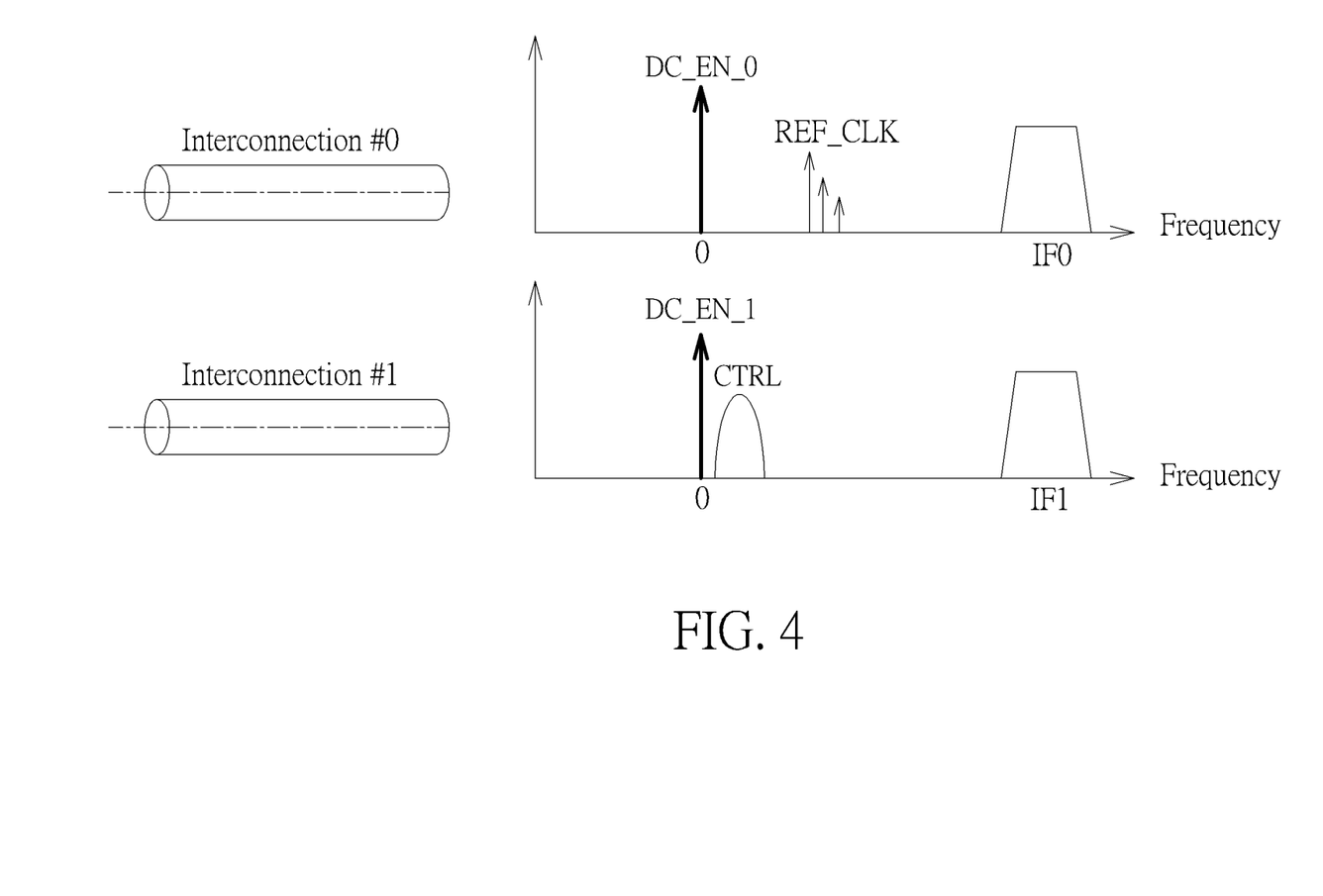
FIG. 4 is a schematic diagram showing the exemplary frequency distributions of two interconnections according to an embodiment of the invention.

FIG. 4 is a schematic diagram showing the exemplary frequency distributions of two interconnections according to an embodiment of the invention. As shown in FIG. 4, the first multiplexed signal carried by the interconnection #0 may comprise an enable signal, such as the enable signal DC_EN_0, for activating one or more components in the slave module, a reference clock signal REF_CLK and the IF signal IF0. The second multiplexed signal carried by the interconnection #1 may comprise another enable signal, such as the enable signal DC_EN_1, for activating one or more components in the slave module, a control signal CTRL and the IF signal IF1.

According to an embodiment of the present invention, the enable signals DC_EN_0 and DC_EN_1 may be the DC signal located at zero frequency. The reference clock signal REF_CLK is located at the intermediate frequencies (for example, about 100~110 MHz), which are different from the frequency band of the IF signals, and is provided to the frequency synthesizer circuits or the PLL circuits in both the master module and the slave module for generating the oscillating signals. The control signal CTRL is modulated at a low IF band (for example, about 50~60 MHz) which is lower than the frequencies of the reference clock signal REF_CLK and the IF signals.

It should be noted that in different embodiments of the invention, the control signal CTRL may be modulated to have a non-zero center frequency or a zero center frequency.

According to a first embodiment of the invention, which is a low-IF approach, the control modem 311 in the host module may modulate the control signal CTRL to have a non-zero center frequency. For example, the control modem 311 may perform frequency shift on the control signal CTRL via a numerically controlled oscillator (NCO) circuit (not shown), so as to move the center frequency to the low IF band (for example, about 50~60 MHz).

According to a second embodiment of the invention, which is a zero-IF approach, the control modem 311 in the host module may modulate the control signal CTRL to have a center frequency of zero frequency. It should be noted that in the embodiments of the invention, the afore-mentioned term "a center frequency of zero frequency" should comprise the case in which the center frequency is exactly located at 0 Hz and also comprise the case in which center frequency is located near zero frequency with a little bit frequency bias or frequency shift, as long as the control signal CTRL is located around the zero frequency. Therefore, the invention should not be limited to the exactly zero frequency case.

Figure 5:
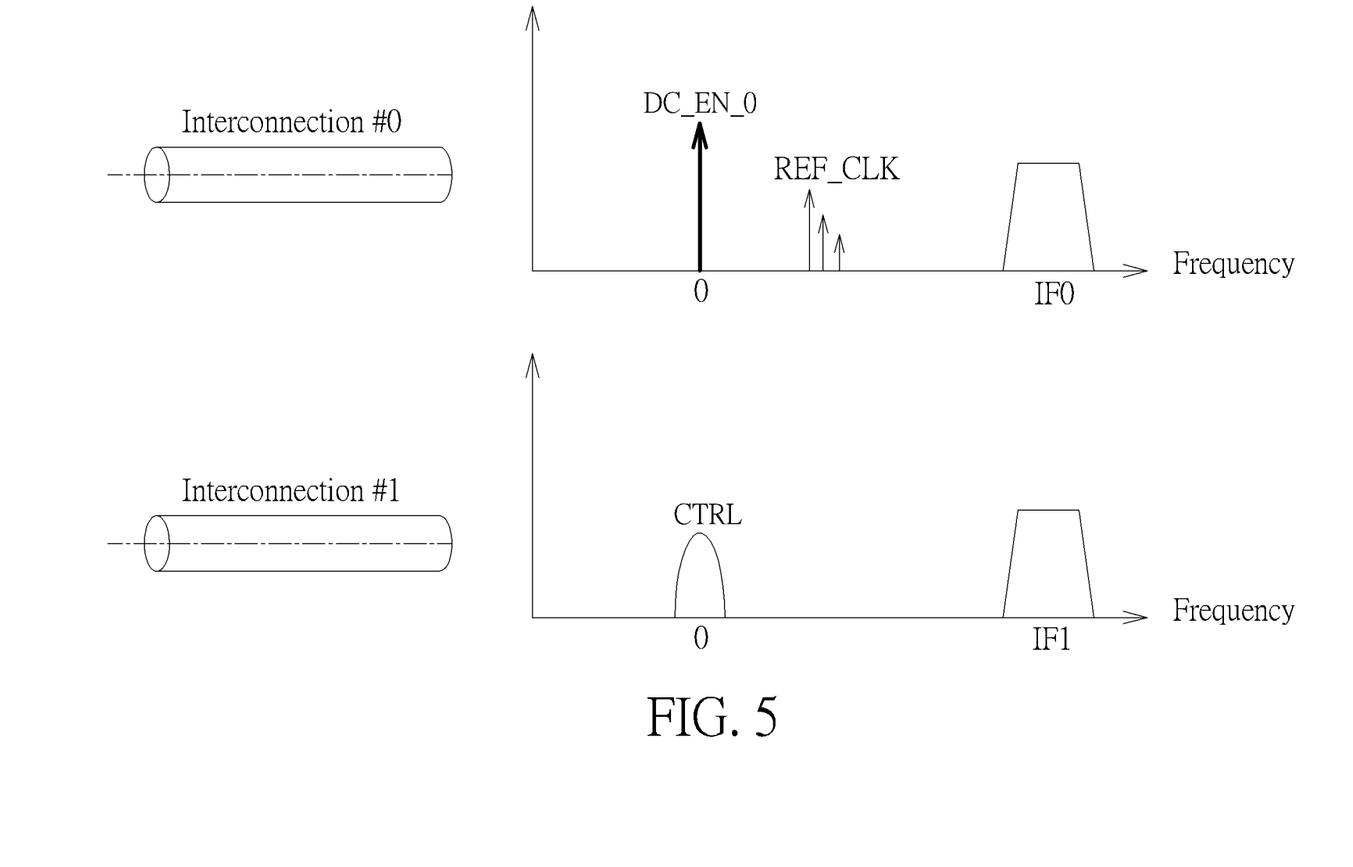
FIG. 5 is a schematic diagram showing the exemplary frequency distributions of two interconnections according to another embodiment of the invention.

FIG. 5 is a schematic diagram showing the exemplary frequency distributions of two interconnections according to another embodiment of the invention. As shown in FIG. 5, the first multiplexed signal carried by the interconnection #0 may comprise an enable signal, such as the enable signal DC_EN_0, for activating one or more components in the slave module, a reference clock signal REF_CLK and the IF signal IF0. The second multiplexed signal carried by the interconnection #1 may comprise a control signal CTRL modulated around zero frequency and the IF signal IF1.

In the second embodiment of the invention, the control signal CTRL may be modulated by a low order modulation scheme, such as the BPSK, with a center frequency around 0 Hz. In addition, in the second embodiment of the invention, another enable signal DC_EN_1 having a predetermined pattern may be embedded in the control signal CTRL or may be encoded in the control signal CTRL, and the control modem 321 in the slave module may detect or extract the enable signal DC_EN_1 from the received control signal CTRL, or may decode the control signal CTRL to obtain the enable signal DC_EN_1.

It should be noted the proposed transmission interface and signal transmission method is not limited to be implemented in a communications apparatus as illustrated in FIG. 1 and FIG. 3, and can actually be applied to any signal transmission between chips, packages, modules or devices. In addition, it should be noted that although the number of physical transmission medium(s) in the afore-mentioned embodiments is 2, the invention should not be limited thereto. In other embodiments of the invention, the number of physical transmission medium(s) can be less than or more than 2.

In summary, in the proposed communications apparatus and the method for transferring signals between a master module/signal processing device and a slave module/signal processing device via the proposed transmission interface, the low-IF or zero-IF control signal CTRL is applied with the reference clock signal REF_CLK transmission for millimeter-wave system application. In addition, to support rank-N MIMO scenario, a minimum of N interconnection(s) is adopted to transfer signals between two modules/signal processing devices, where N is a positive integer and N>=1. Therefore, there may also be only one interconnection configured between two modules/signal processing devices to carry a multiplexed signal in which at least two signals are integrated. For example, the single interconnection may occurred at the MIMO rank-1 case (i.e. Single Input Single Output (SISO)), and the signal integration of the multiplexed signal may be, for example, a combination of an IF signal and the reference clock signal REF_CLK, a combination of an IF signal and the control signal CTRL, a combination of an IF signal, the reference clock signal REF_CLK and the control signal CTRL, a combination of the enable signal DC_EN, an IF signal, the reference clock signal REF_CLK and the control signal CTRL, or others, wherein the combined signals are modulated at different frequencies. In addition, the control signal CTRL may be processed in a low-IF approach or a zero-IF approach as discussed above, increasing the design flexibility.

Figure 6:
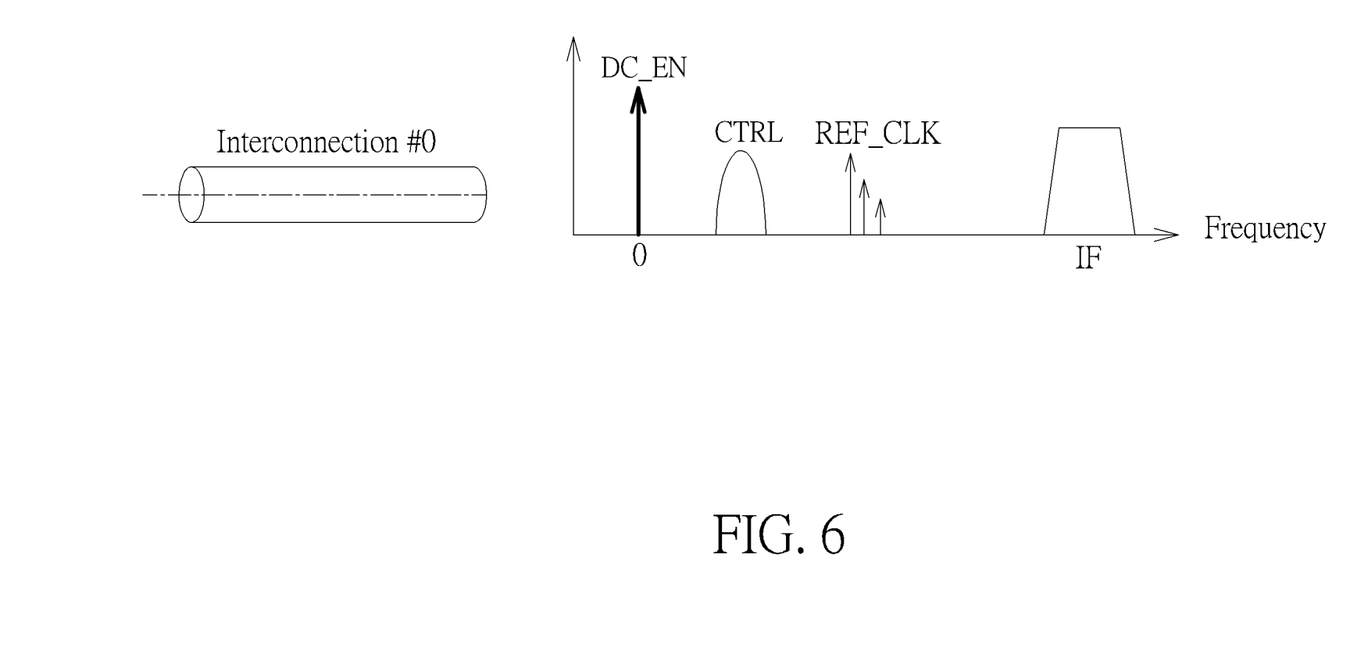
FIG. 6 is a schematic diagram showing the exemplary frequency distributions of single interconnection according to an embodiment of the invention.

FIG. 6 is a schematic diagram showing the exemplary frequency distributions of single interconnection according to an embodiment of the invention. In this embodiment, the signal integration of the multiplexed signal carried on the single interconnection is a combination of a enable signal DC_EN for activating one or more components comprised in the RF signal processing device, an IF signal IF, the reference clock signal REF_CLK and the control signal CTRL for controlling operations of one or more components comprised in the RF signal processing device.

It should be noted that in the conventional design, no PLL circuit is configured in the RF signal processing device. Therefore, the IF signal processing device has to transmit the local oscillating signal generated by its local PLL circuit to the RF signal processing device instead of transmitting the reference clock signal REF_CLK. In addition, in the conventional design, the control modem does not perform frequency shift on the control signal to move the center frequency of the control signal to a low IF band. In some conventional designs, the control signal is shifted to an extreme high frequency that is much higher than this invention, and the extreme high frequency will request an extra transceiver to support such implementation. On the contrary, in the proposed communications apparatus and the method for transferring signals between a master module/signal processing device and a slave module/signal processing device via the proposed transmission interface, the center frequency of the control signal may be moved to a low IF band with high modulation scheme. In this manner, better system performance balance between control-link throughput, power consumption, and module design complexity and be achieved.

Therefore, as compared to the conventional design, lower power consumption and lower design complexity can be achieved. In addition, it is also easier to achieve control timing synchronization across multiple modules/signal processing devices, and the module design is more extensible.

In addition, since in the embodiments of the invention, the reference clock signal REF_CLK is shared between multiple modules/signal processing devices, the noise correlation issue can be mitigated as compared to the conventional design and a better tradeoff between power and noise performance can be achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transmission interface between at least a first module and a second module, comprising:
    at least two physical transmission mediums,
    wherein each physical transmission medium is arranged to carry a multiplexed signal in which at least two signals are integrated, and wherein the at least two physical transmission mediums comprise:
    a first physical transmission medium, arranged to carry a first multiplexed signal comprising a first intermediate frequency (IF) signal and a reference clock signal, wherein the first IF signal and the reference clock signal are at different frequencies.

2. The transmission interface of claim 1, wherein the at least two physical transmission mediums further comprise:
    a second physical transmission medium, arranged to carry a second multiplexed signal comprising a second IF signal and a control signal, wherein the second IF signal and the control signal are at different frequencies.

3. The transmission interface of claim 2, wherein the first multiplexed signal further comprises a first enable signal, the second multiplexed signal further comprises a second enable signal, the first enable signal and the second enable signal are direct current (DC) signals located at zero frequency and are provided to the second module for activating a first portion and a second portion of components in the second module, the reference clock signal is provided to a frequency synthesizer circuit in the second module for generating an oscillating signal according to the reference clock signal, and the control signal is provided to a control modem in the second module for controlling the components in the second module according to the control signal.

4. The transmission interface of claim 2, wherein the control signal has a non-zero center frequency.

5. The transmission interface of claim 2, wherein the first multiplexed signal further comprises an enable signal, the enable signal is a direct current (DC) signal located at zero frequency and is provided to the second module for activating one or more components in the second module, the control signal is a signal having a center frequency of zero frequency and is provided to a control modem in the second module for controlling the components in the second module according to the control signal, and the reference clock signal is provided to a frequency synthesizer circuit in the second module for generating an oscillating signal according to the reference clock signal.

6. The transmission interface of claim 1, wherein the first multiplexed signal further comprises an enable signal, the enable signal is a direct current (DC) signal located at zero frequency and is provided to the second module for activating one or more components in the second module, and the reference clock signal is provided to a frequency synthesizer circuit in the second module for generating an oscillating signal according to the reference clock signal.

7. A method for transferring a plurality signals between a first module and a second module, comprising:
    utilizing at least two physical transmission mediums to transfer the signals from the first module to the second module or from the second module to the first module, wherein each physical transmission medium is arranged to carry a multiplexed signal in which at least two signals are integrated, and
    wherein the step of utilizing the at least two physical transmission mediums to transfer the signals from the first module to the second module or from the second module to the first module further comprises:
    utilizing a first physical transmission medium to transfer a first portion of the signals, wherein the first physical transmission medium is arranged to carry a first multiplexed signal comprising a first intermediate frequency (IF) signal and a reference clock signal, and the first IF signal and the reference clock signal are at different frequencies.

8. The method of claim 7, wherein the step of utilizing the at least two physical transmission mediums to transfer the signals from the first module to the second module or from the second module to the first module further comprises:
    utilizing a second physical transmission medium to transfer a second portion of the signals, wherein the second physical transmission medium is arranged to carry a second multiplexed signal comprising a second IF signal and a control signal, and the second IF signal and the control signal are at different frequencies.

9. The method of claim 8, wherein the first multiplexed signal further comprises a first enable signal for activating a first portion of components in the second module, the second multiplexed signal further comprises a second enable signal for activating a second portion of components in the second module, the first enable signal and the second enable signal are direct current (DC) signals located at zero frequency, the reference clock signal is provided to a frequency synthesizer circuit in the second module for generating an oscillating signal according to the reference clock signal, and the control signal is provided to a control modem in the second module for controlling the components in the second module according to the control signal.

10. The method of claim 8, wherein the first multiplexed signal further comprises an enable signal for activating one or more components in the second module, the enable signal is a direct current (DC) signal located at zero frequency, the control signal is a signal having a center frequency of zero frequency, the control signal is provided to a control modem in the second module for controlling the components in the second module according to the control signal, and the reference clock signal is provided to a frequency synthesizer circuit in the second module for generating an oscillating signal according to the reference clock signal.

11. The method of claim 7, wherein the first multiplexed signal further comprises an enable signal for activating one or more components in the second module, the enable signal is a direct current (DC) signal located at zero frequency, and the reference clock signal is provided to a frequency synthesizer circuit in the second module for generating an oscillating signal according to the reference clock signal.

12. A communications apparatus, comprising:
    an intermediate frequency (IF) signal processing device, arranged to generate a predetermined number of IF stream(s) according to a baseband signal;
    a radio frequency (RF) signal processing device, arranged to generate the predetermined number of RF stream(s)

according to the IF stream(s) received from the IF signal processing device; and
a transmission interface, coupled between the IF signal processing device and the RF signal processing device and comprising at least two physical transmission mediums,
wherein each physical transmission medium is arranged to carry a multiplexed signal in which at least two signals are integrated, and
wherein the IF signal processing device comprises:
a first diplexer circuit, arranged to combine a first IF signal and a reference clock signal as a portion of a first multiplexed signal, wherein the first IF signal and the reference clock signal are at different frequencies, and
the transmission interface comprises:
a first physical transmission medium, coupled to a first port of the IF signal processing device and arranged to carry the first multiplexed signal.

13. The communications apparatus of claim 12, wherein the IF signal processing device further comprises:
a second diplexer circuit, arranged to combine a second IF signal and a control signal as a portion of a second multiplexed signal, wherein the second IF signal and the control signal are at different frequencies, and
the transmission interface further comprises:
a second physical transmission medium, coupled to a second port of the IF signal processing device and arranged to carry the second multiplexed signal.

14. The communications apparatus of claim 13, wherein the IF signal processing device further comprises:
a first injection circuit, coupled to an output terminal of the first diplexer circuit and arranged to inject a first enable signal into an output of the first diplexer circuit to generate the first multiplexed signal; and
a second injection circuit, coupled to an output terminal of the second diplexer circuit and arranged to inject a second enable signal into an output of the second diplexer circuit to generate the second multiplexed signal, and
the RF signal processing device comprises:
a frequency synthesizer circuit, arranged to generate an oscillating signal, wherein the first enable signal is a direct current (DC) signal located at zero frequency and provided to the RF signal processing device for activating a first portion of components in the RF signal processing device, the second enable signal is a DC signal located at zero frequency and provided to the RF signal processing device for activating a second portion of components in the RF signal processing device, the reference clock signal is provided to the frequency synthesizer circuit for generating an oscillating signal according to the reference clock signal, and the control signal is provided to a control modem in the RF signal processing device for controlling the components in the RF signal processing device according to the control signal.

15. The communications apparatus of claim 13, wherein the control signal has a non-zero center frequency.

16. The communications apparatus of claim 13, wherein the IF signal processing device further comprises:
an injection circuit, coupled to an output terminal of the first diplexer circuit and arranged to inject an enable signal into an output of the first diplexer circuit to generate the first multiplexed signal, and
the RF signal processing device comprises:
a frequency synthesizer circuit, arranged to generate an oscillating signal, wherein the enable signal is a direct current (DC) signal located at zero frequency and provided to the RF signal processing device for activating one or more components in the RF signal processing device, the control signal is a signal having a center frequency of zero frequency, the control signal is provided to a control modem in the RF signal processing device for controlling the components in the RF signal processing device according to the control signal, and the reference clock signal is provided to the frequency synthesizer circuit for generating the oscillating signal according to the reference clock signal.

17. The communications apparatus of claim 12, wherein the IF signal processing device further comprises:
a first injection circuit, coupled to an output terminal of the first diplexer circuit and arranged to inject an enable signal into an output of the first diplexer circuit to generate the first multiplexed signal, and
the RF signal processing device comprises:
a frequency synthesizer circuit, arranged to generate an oscillating signal, wherein the enable signal is a direct current (DC) signal located at zero frequency and provided to the RF signal processing device for activating one or more components in the RF signal processing device, and the reference clock signal is provided to the frequency synthesizer circuit for generating the oscillating signal according to the reference clock signal.

18. A transmission interface between at least a first module and a second module, comprising:
at least two physical transmission mediums,
wherein each physical transmission medium is arranged to carry a multiplexed signal in which at least two signals are integrated, and
wherein the at least two physical transmission mediums comprise:
a first physical transmission medium, arranged to carry a first multiplexed signal comprising a first intermediate frequency (IF) signal and a control signal, wherein the first IF signal and the control signal are at different frequencies.

19. The transmission interface of claim 18, wherein the at least two physical transmission mediums further comprise:
a second physical transmission medium, arranged to carry a second multiplexed signal comprising a second IF signal and a reference clock signal, wherein the second IF signal and the reference clock signal are at different frequencies.

20. The transmission interface of claim 19, wherein the first multiplexed signal further comprises a first enable signal, the second multiplexed signal further comprises a second enable signal, the first enable signal and the second enable signal are direct current (DC) signals located at zero frequency and are provided to the second module for activating a first portion and a second portion of components in the second module, the reference clock signal is provided to a frequency synthesizer circuit in the second module for generating an oscillating signal according to the reference clock signal, and the control signal is provided to a control modem in the second module for controlling the components in the second module according to the control signal.

21. The transmission interface of claim 19, wherein the second multiplexed signal further comprises an enable signal, the enable signal is a direct current (DC) signal located at zero frequency and is provided to the second module for activating one or more components in the second module, the control signal is a signal having a center frequency of zero frequency and is provided to a control modem in the second module for controlling the components in the second module according to the control signal, and the reference clock signal is provided to a frequency synthesizer circuit in the second module for generating an oscillating signal according to the reference clock signal.

22. The transmission interface of claim 18, wherein the first multiplexed signal further comprises an enable signal, the enable signal is a direct current (DC) signal located at zero frequency and is provided to the second module for activating one or more components in the second module, and the control signal is provided to a control modem in the second module for controlling the components in the second module according to the control signal.

23. The transmission interface of claim 18, wherein the control signal has a non-zero center frequency.

24. A method for transferring a plurality signals between a first module and a second module, comprising:
   utilizing at least two physical transmission mediums to transfer the signals from the first module to the second module or from the second module to the first module, wherein each physical transmission medium is arranged to carry a multiplexed signal in which at least two signals are integrated, and
   wherein the step of utilizing the at least two physical transmission mediums to transfer the signals from the first module to the second module or from the second module to the first module further comprises:
   utilizing a first physical transmission medium to transfer a first portion of the signals, wherein the first physical transmission medium is arranged to carry a first multiplexed signal comprising a first intermediate frequency (IF) signal and a control signal, and the first IF signal and the control signal are at different frequencies.

25. The method of claim 24, wherein the step of utilizing the at least two physical transmission mediums to transfer the signals from the first module to the second module or from the second module to the first module further comprises:
   utilizing a second physical transmission medium to transfer a second portion of the signals, wherein the second physical transmission medium is arranged to carry a second multiplexed signal comprising a second IF signal and a reference clock signal, and the second IF signal and the reference clock signal are at different frequencies.

26. The method of claim 25, wherein the first multiplexed signal further comprises a first enable signal for activating a first portion of components in the second module, the second multiplexed signal further comprises a second enable signal for activating a second portion of components in the second module, the first enable signal and the second enable signal are direct current (DC) signals located at zero frequency, the reference clock signal is provided to a frequency synthesizer circuit in the second module for generating an oscillating signal according to the reference clock signal, and the control signal is provided to a control modem in the second module for controlling the components in the second module according to the control signal.

27. The method of claim 25, wherein the second multiplexed signal further comprises an enable signal for activating one or more components in the second module, the enable signal is a direct current (DC) signal located at zero frequency, the control signal is a signal having a center frequency of zero frequency, the control signal is provided to a control modem in the second module for controlling the components in the second module according to the control signal, and the reference clock signal is provided to a frequency synthesizer circuit in the second module for generating an oscillating signal according to the reference clock signal.

28. The method of claim 24, wherein the first multiplexed signal further comprises an enable signal for activating one or more components in the second module, the enable signal is a direct current (DC) signal located at zero frequency, and the control signal is provided to a control modem in the second module for controlling the components in the second module according to the control signal.

29. A communications apparatus, comprising:
   an intermediate frequency (IF) signal processing device, arranged to generate a predetermined number of IF stream(s) according to a baseband signal;
   a radio frequency (RF) signal processing device, arranged to generate the predetermined number of RF stream(s) according to the IF stream(s) received from the IF signal processing device; and
   a transmission interface, coupled between the IF signal processing device and the RF signal processing device and comprising at least two physical transmission mediums,
   wherein each physical transmission medium is arranged to carry a multiplexed signal in which at least two signals are integrated, and
   wherein the IF signal processing device comprises:
   a first diplexer circuit, arranged to combine a first IF signal and a control signal as a portion of a first multiplexed signal, wherein the first IF signal and the control signal are at different frequencies, and
   the transmission interface comprises:
   a first physical transmission medium, coupled to a first port of the IF signal processing device and arranged to carry the first multiplexed signal.

30. The communications apparatus of claim 29, wherein the IF signal processing device further comprises:
   a second diplexer circuit, arranged to combine a second IF signal and a reference clock signal as a portion of a second multiplexed signal, wherein the second IF signal and the reference clock signal are at different frequencies, and
   the transmission interface further comprises:
   a second physical transmission medium, coupled to a second port of the IF signal processing device and arranged to carry the second multiplexed signal.

31. The communications apparatus of claim 30, wherein the IF signal processing device further comprises:
   a first injection circuit, coupled to an output terminal of the first diplexer circuit and arranged to inject a first enable signal into an output of the first diplexer circuit to generate the first multiplexed signal; and
   a second injection circuit, coupled to an output terminal of the second diplexer circuit and arranged to inject a second enable signal into an output of the second diplexer circuit to generate the second multiplexed signal, and
   the RF signal processing device comprises:
   a frequency synthesizer circuit, arranged to generate an oscillating signal, wherein the first enable signal is a direct current (DC) signal located at zero frequency and provided to the RF signal processing device for activating a first portion of components in the RF signal processing device, the second enable signal is a DC signal located at zero frequency and provided to the RF signal processing device for activating a second portion of components in the RF signal processing device, and the reference clock signal is provided to the frequency synthesizer circuit for generating an oscillating signal according to the reference clock signal, the control signal is provided to a control modem in the RF signal processing device for controlling the components in the RF signal processing device according to the control signal.

32. The communications apparatus of claim 30, wherein the IF signal processing device further comprises:
- an injection circuit, coupled to an output terminal of the second diplexer circuit and arranged to inject an enable signal into an output of the second diplexer circuit to generate the second multiplexed signal, and the RF signal processing device comprises:
- a frequency synthesizer circuit, arranged to generate an oscillating signal, wherein the enable signal is a direct current (DC) signal located at zero frequency and provided to the RF signal processing device for activating one or more components in the RF signal processing device, the control signal is a signal having a center frequency of zero frequency, the control signal is provided to a control modem in the RF signal processing device for controlling the components in the RF signal processing device according to the control signal, and the reference clock signal is provided to the frequency synthesizer circuit for generating the oscillating signal according to the reference clock signal.

33. The communications apparatus of claim 29, wherein the IF signal processing device further comprises:
- a first injection circuit, coupled to an output terminal of the first diplexer circuit and arranged to inject an enable signal into an output of the first diplexer circuit to generate the first multiplexed signal, wherein the enable signal is a direct current (DC) signal located at zero frequency.

34. The communications apparatus of claim 29, wherein the control signal has a non-zero center frequency.

* * * * *